Nov. 24, 1925.  
F. M. CARROLL  
TABULATING CARD PRINTER  
Filed April 14, 1922   15 Sheets-Sheet 1

1,563,014

INVENTOR  
Fred M. Carroll  
BY  
Cooper, Kerr & Dunham  
ATTORNEYS.

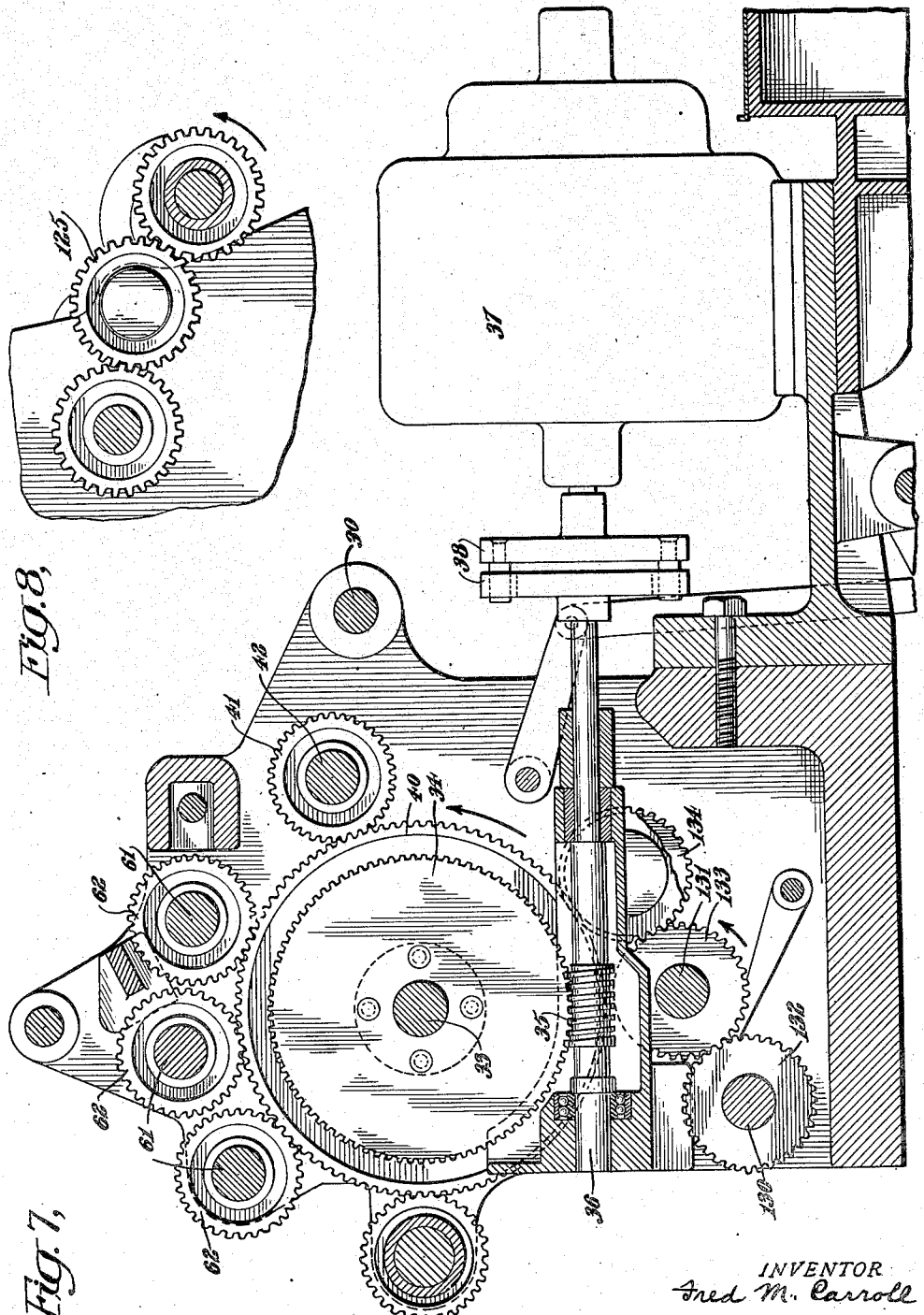

Nov. 24, 1925.  
F. M. CARROLL  
1,563,014  
TABULATING CARD PRINTER  
Filed April 14, 1922  
15 Sheets-Sheet 8
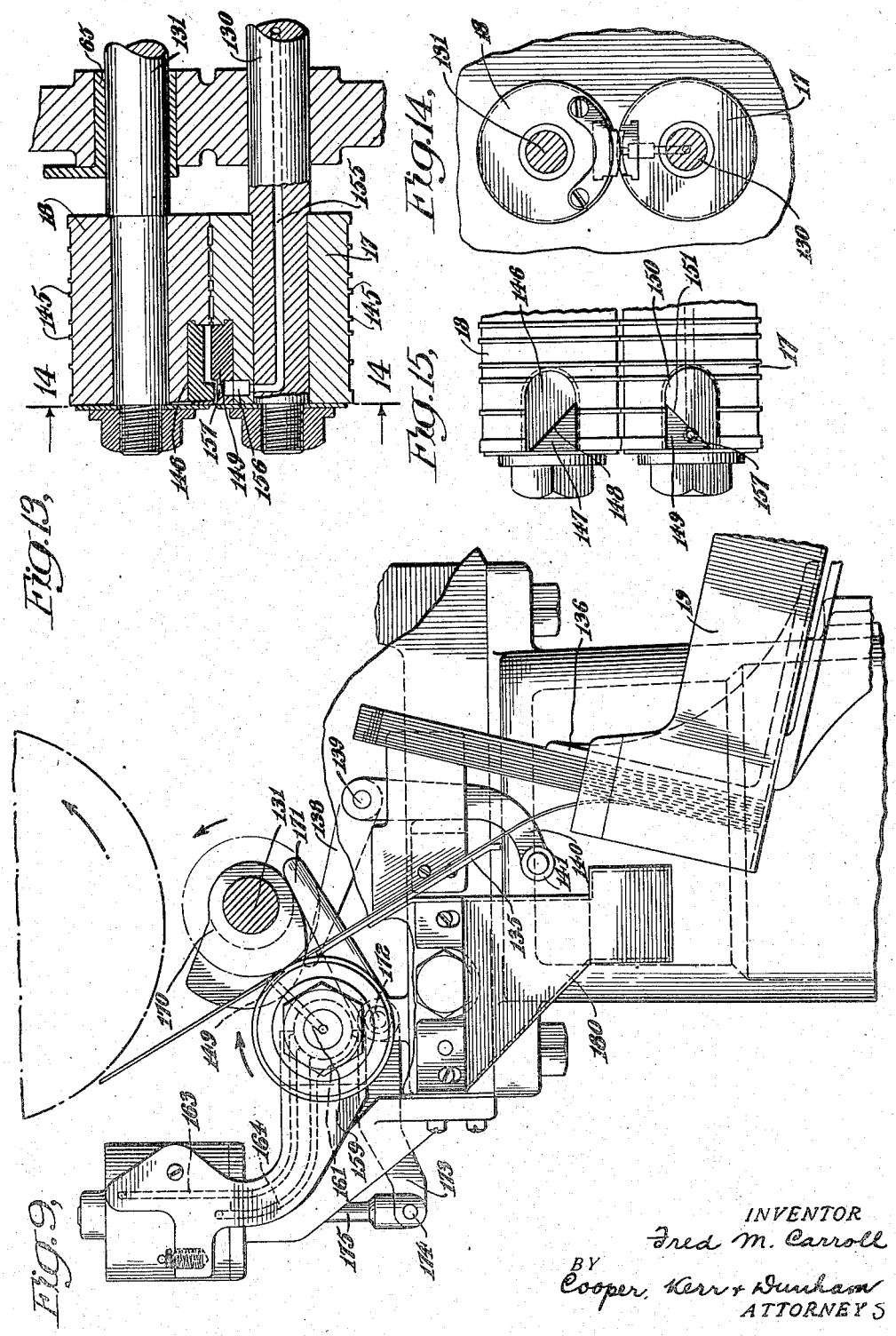
INVENTOR  
Fred M. Carroll  
BY  
Cooper, Kerr + Dunham  
ATTORNEYS

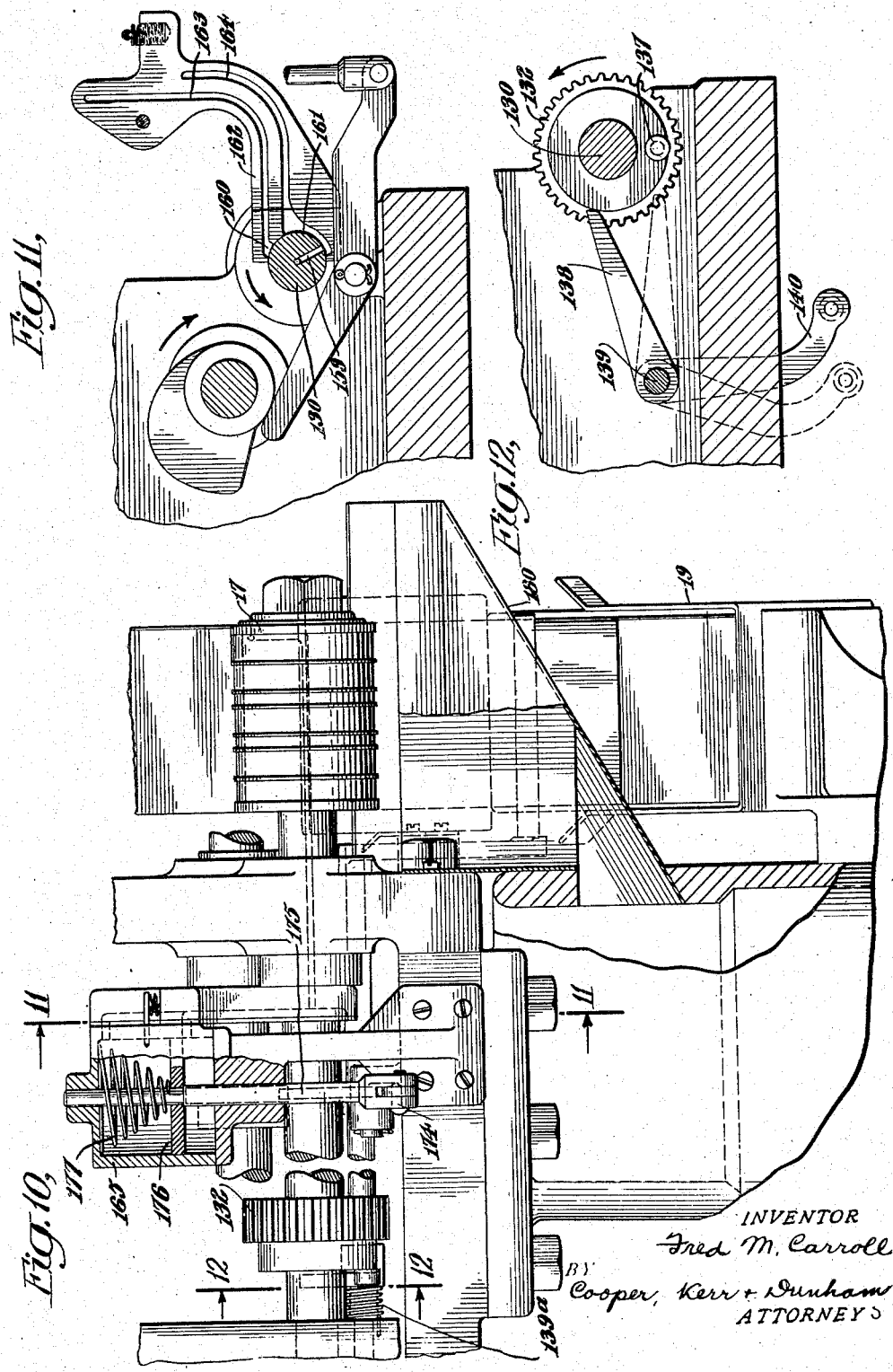

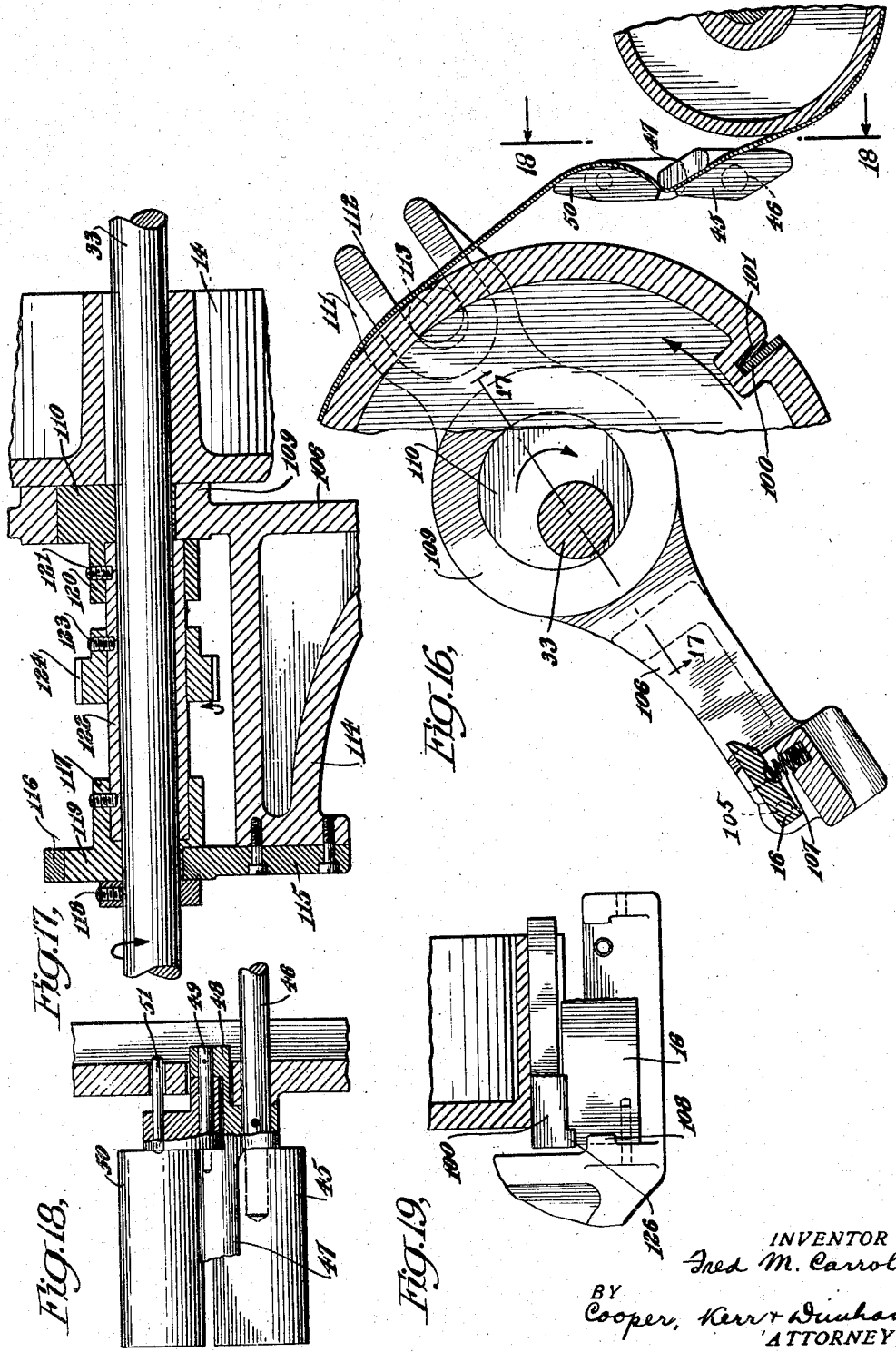

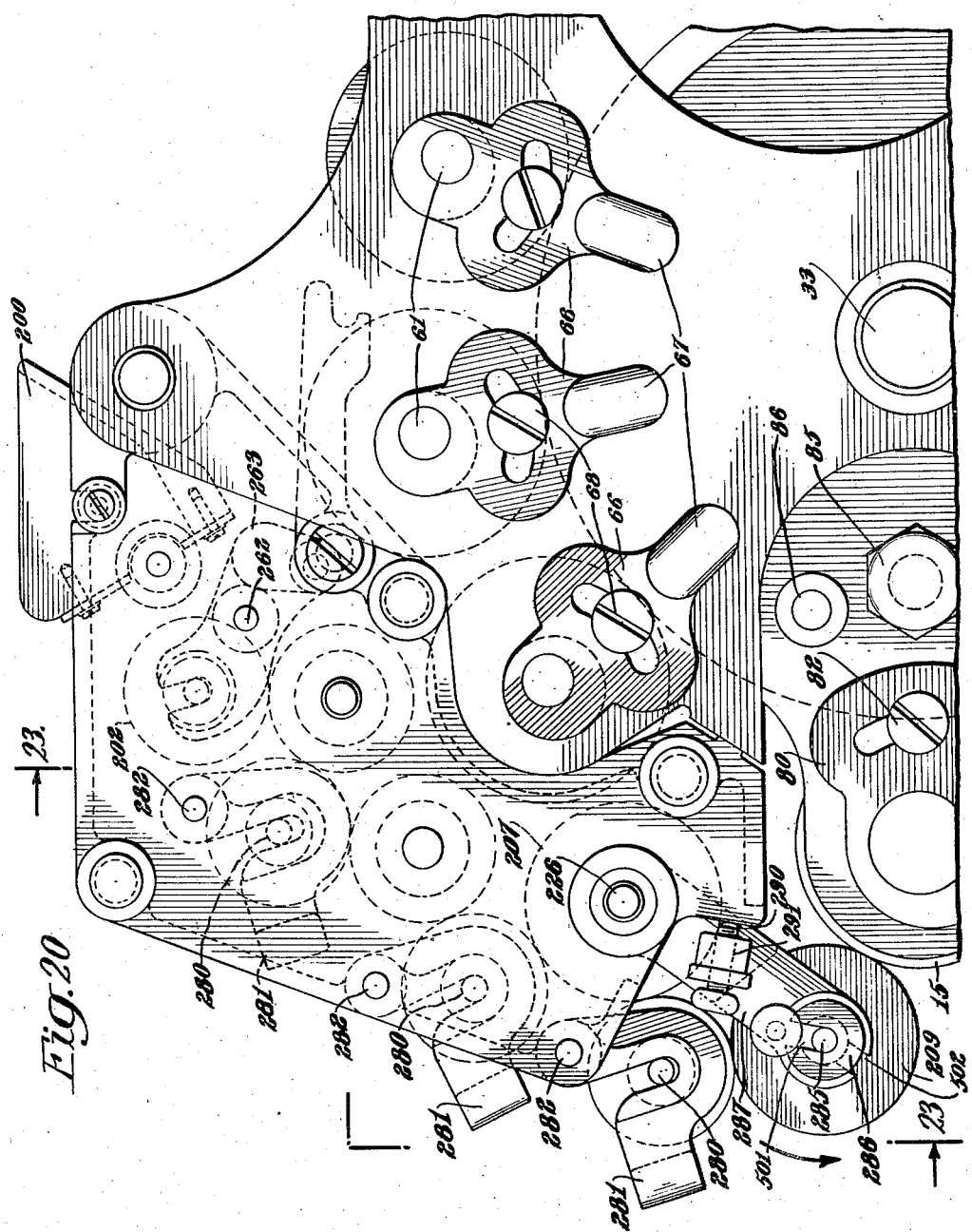

Nov. 24, 1925.
F. M. CARROLL
TABULATING CARD PRINTER
Filed April 14, 1922 15 Sheets-Sheet 12
1,563,014
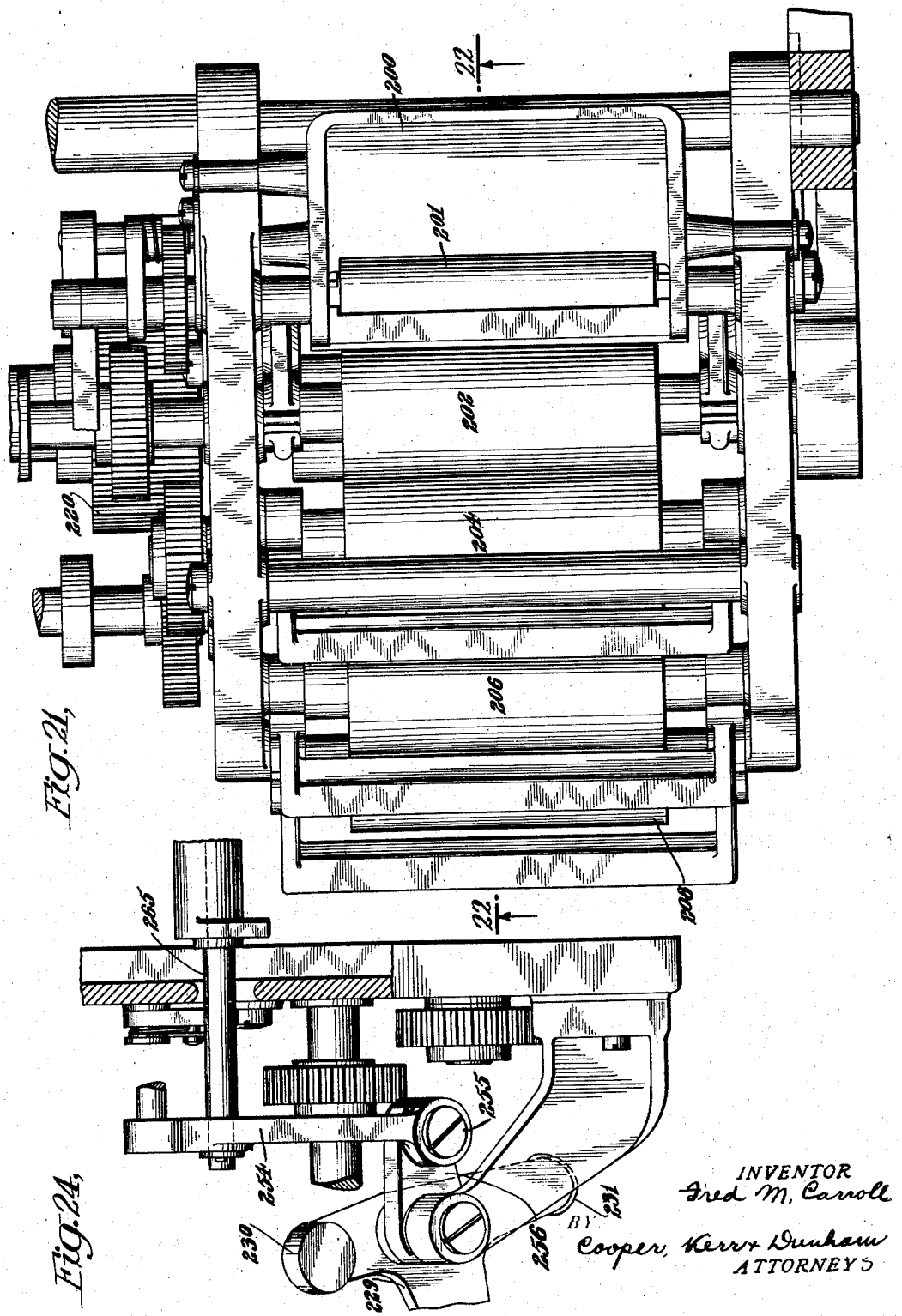
INVENTOR
Fred M. Carroll
BY Cooper, Kerr & Dunham
ATTORNEYS

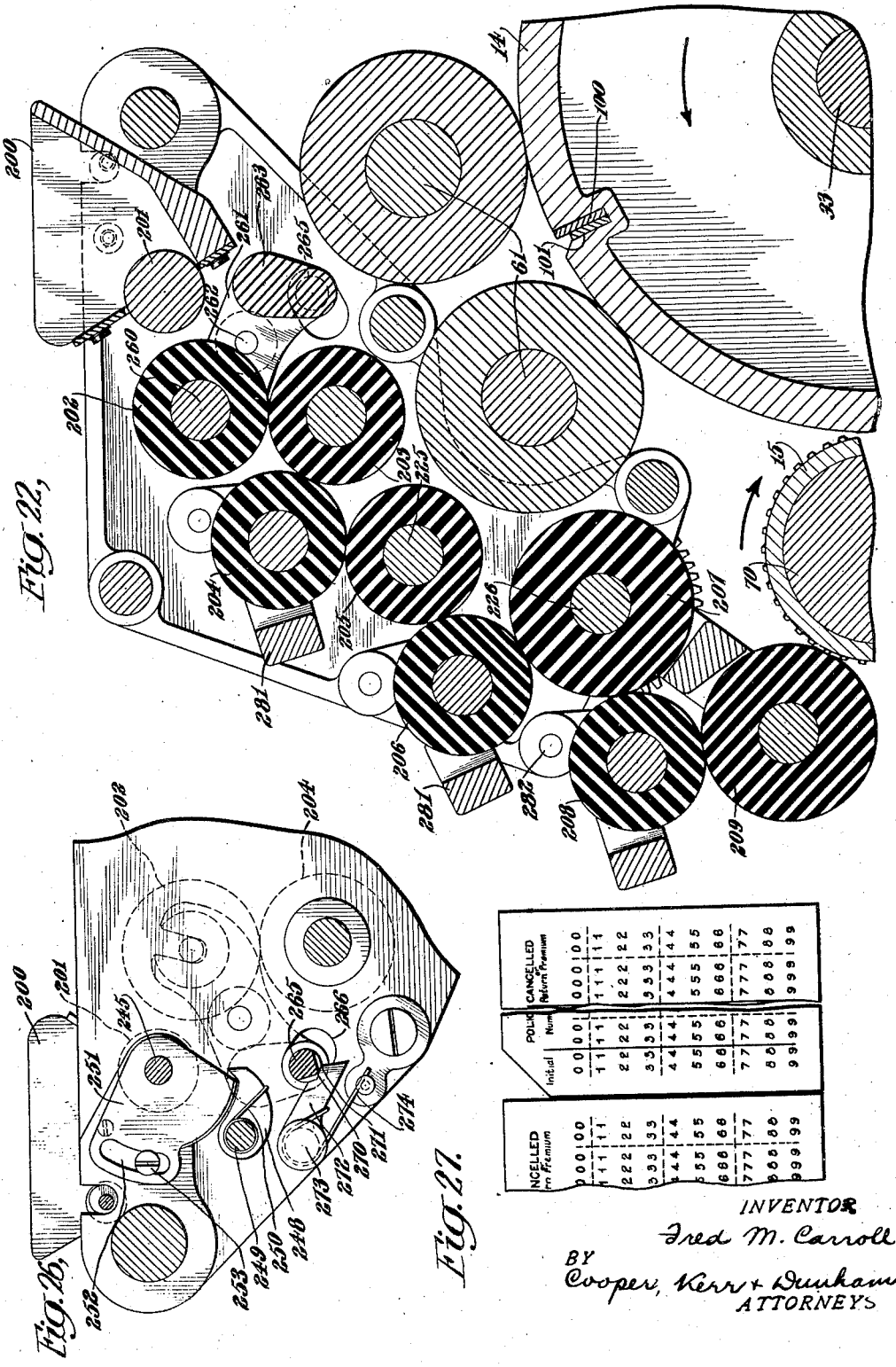

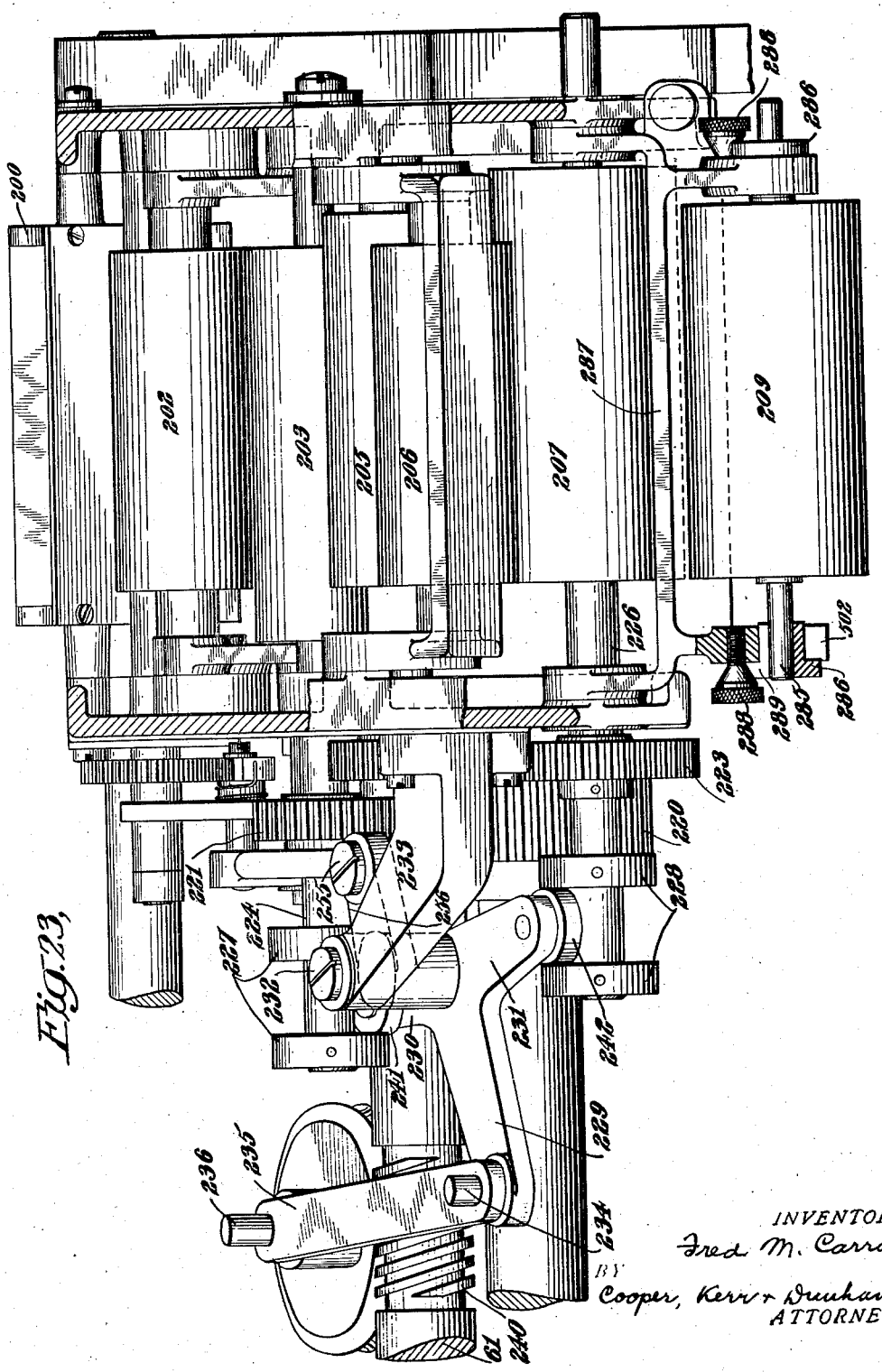

Patented Nov. 24, 1925.

1,563,014

UNITED STATES PATENT OFFICE.

FRED M. CARROLL, OF ENDICOTT, NEW YORK, ASSIGNOR TO THE TABULATING MACHINE COMPANY, OF ENDICOTT, NEW YORK, A CORPORATION OF NEW JERSEY.

TABULATING-CARD PRINTER.

Application filed April 14, 1922. Serial No. 552,654.

*To all whom it may concern:*

Be it known that I, FRED M. CARROLL, a citizen of the United States, residing at Endicott, in the county of Broome and State of New York, have invented certain new and useful Improvements in Tabulating-Card Printers, of which the following is a full, clear, and exact description.

This invention relates to printing machines. More specifically it relates to card-printing machines and, from a still more specific aspect it relates to machines for printing tabulating cards; i. e., cards to be punched and employed in connection with tabulating machines of the general type illustrated in the United States Patent No. 1,087,061, February 10, 1914, H. Hollerith, and numerous other patents.

One of the principal objects of the invention is to provide a printing machine of increased efficiency and economy and adapted to receive blank material and to discharge accurately printed cards, of accurate size and shape. Other important objects and advantages will appear as the invention is hereinafter disclosed.

Referring to the drawings which illustrate what I now consider a preferred form of machine:—

Fig. 7 is a sectional elevation taken substantially on the line 7—7 of Fig. 5.

Fig. 8 is a detail elevation taken substantially on the line 8—8 of Fig. 5.

Fig. 9 is a detail elevation, with parts broken away, of a portion of the machine illustrated in complete elevation in Fig. 1.

Fig. 10 is a detail elevation, with parts broken away, illustrating more clearly that part of the machine shown in the lower portion of Fig. 6.

Figs. 11 and 12 are detail sectional elevations taken substantially on the lines 11—11 and 12—12, respectively, of Fig. 10.

Fig. 13 is a detail sectional view taken on a plane through the axes of the card-corner-clipping rolls.

Fig. 14 is a detail end sectional view taken substantially on the line 14—14 of Fig. 13.

Fig. 15 is a side elevation of the structure illustrated in Fig. 14 with the two rolls rotated through 90 degrees.

Fig. 16 is an enlarged sectional detail elevation through certain parts of the machine and including a portion of the main drum cutting or shearing knife, etc.

Fig. 17 is a detail section taken substantially on the line 17—17 of Fig. 16.

Fig. 18 is a detail elevation, partly in section, on the line 18—18 of Fig. 16 illustrating the paper-straightening means employed.

Fig. 19 is a detail view, partly in section, illustrating the card-shearing means and taken substantially on the plane of the line 17—17 of Fig. 16.

Figure 1:
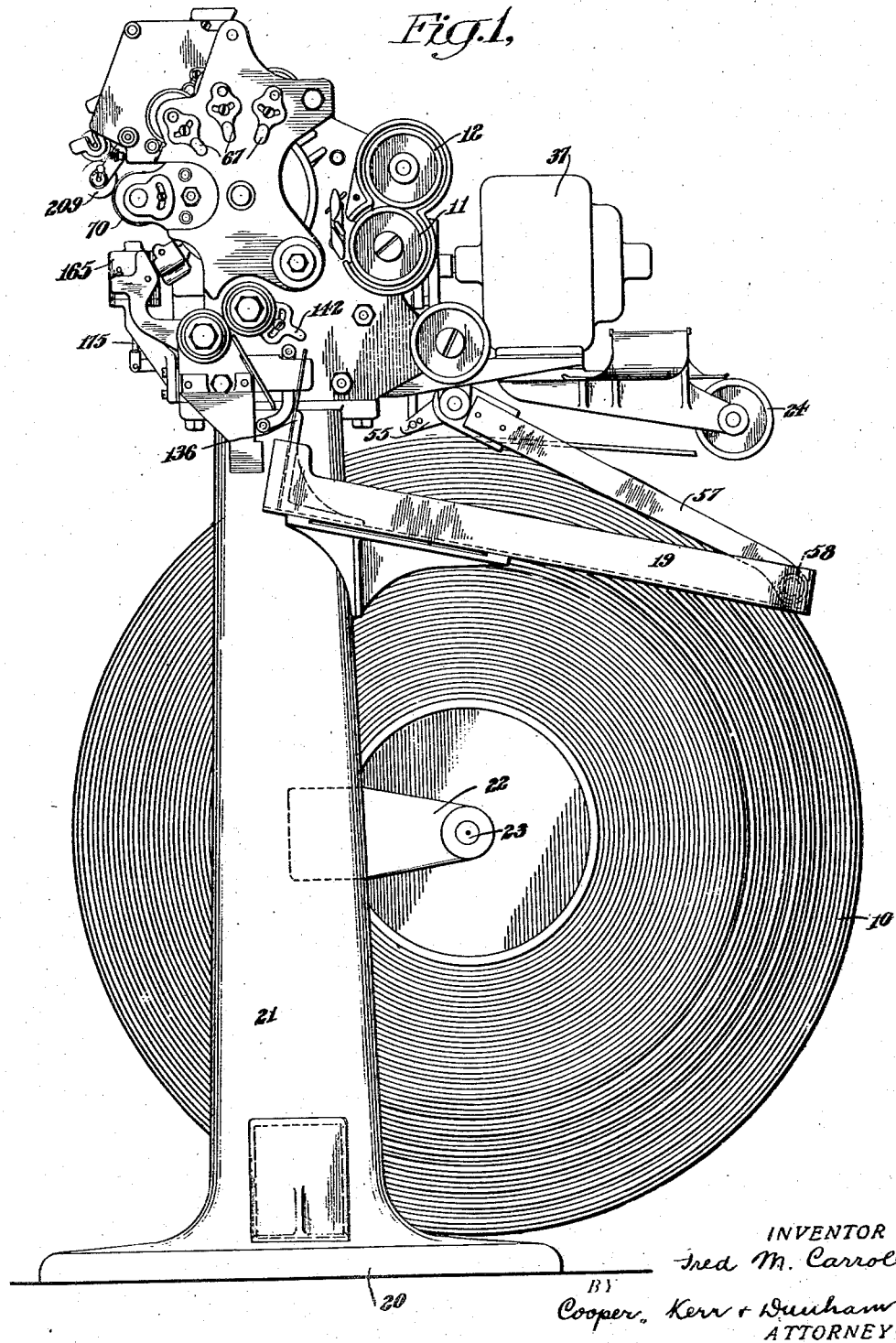
Fig. 1 is an elevation of the machine.

Fig. 20 is an enlarged detail elevation illustrating the parts shown in the upper part of Fig. 1.

Fig. 21 is a plan view of the mechanism shown in Fig. 20.

Fig. 22 is a sectional elevation taken substantially on the line 22—22 of Fig. 21.

Fig. 23 is a sectional elevation taken substantially on the line 23—23 of Fig. 20.

Figure 25:
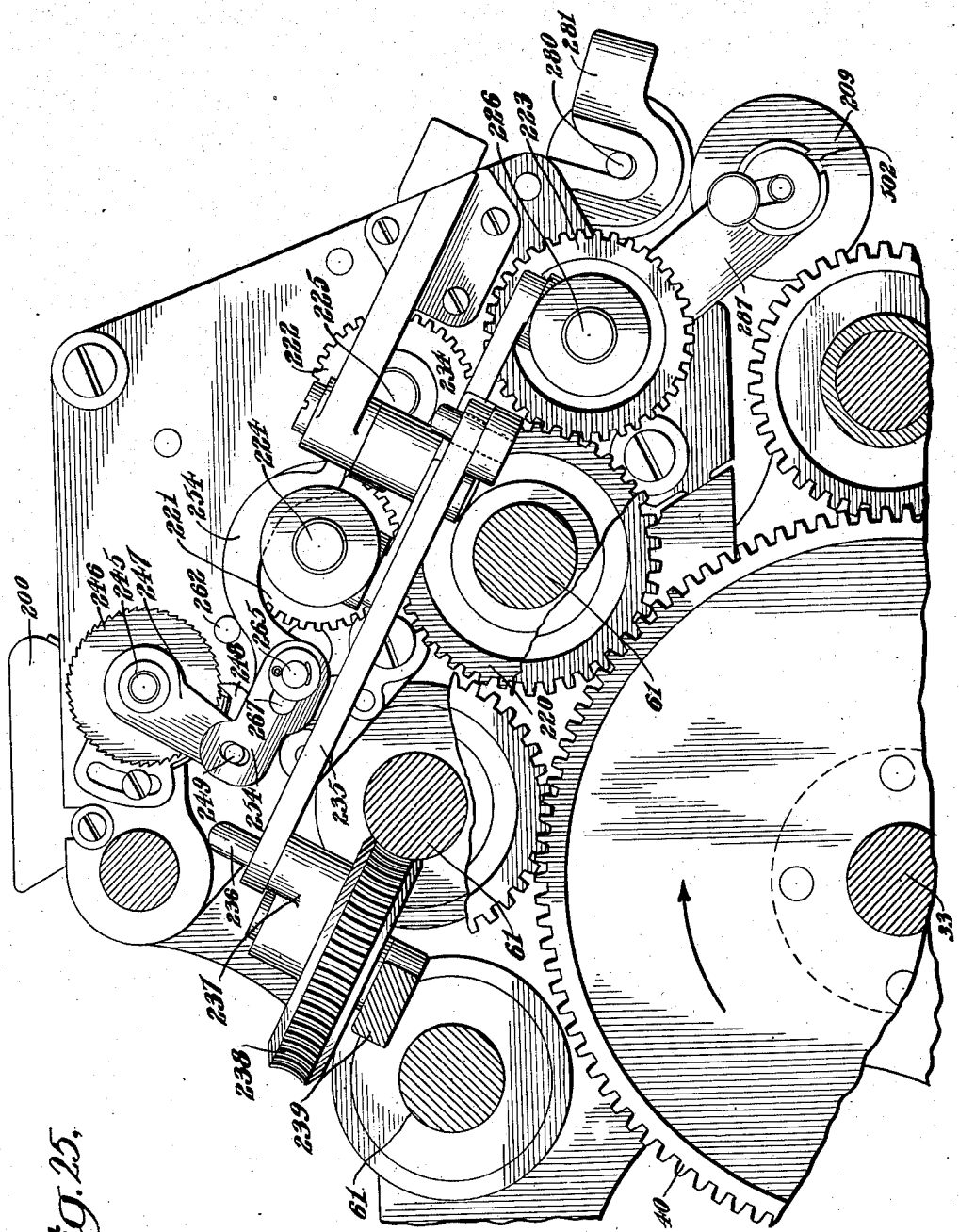

Fig. 24 is a detail plan view, partly in section, of certain of the parts shown in Fig. 25.

Fig. 25 is a detail side elevation, partly in section, of the upper portion of the machine.

Fig. 26 is a detail elevation, partly in section, of the upper part of the mechanism shown in Fig. 25.

Fig. 27 is a view illustrating a plurality of finished cards.

Before describing the detailed construction of the preferred form of machine illustrated, I shall explain generally the course of the material through the machine. The blank material passes from the roll 10 (Fig. 1) over suitable guide devices to and around feed rollers or drums 11, 12 (see Fig. 4). The material then passes through a straightening device, generally designated as 13, and thence around the platen 14. A type roll 15, inked as hereinafter described cooperates with the platen 14 to print the desired subject-matter on the material. A shearing device 16 severs each printed card from its neighbor as the printed material is about to leave the platen. Devices including rollers 18 and 19 receive and remove the cards from the platen and transfer them to the receptacle or tray 19. In certain cases it is desirable to remove the corner of a card. This may be effected by means hereinafter disclosed. I shall now proceed to describe the construction of the various instrumentalities.

The machine comprises a base 20 and pedestal 21 which support the entire mechanism. The pedestal carries journal brackets 22 which in turn support a shaft 23 upon which a roll 10 of blank material is detachably and rotatably mounted. The blank material passes from the roll 10 (see Figs. 1 and 3) over a flanged idler or guide roller 24, journaled on the frame of the machine, thence over a guide plate or trackway 25 provided with side flanges 26, 26, to track the material. By virtue of the structure thus far described, the roll 10 or rolls 10 may be located at one side of the machine. The material passes from the track-way 25 around a flanged idler or guide roll 27 (Fig. 4) suitably journaled in the frame of the machine and thence to the feed rolls 11, 12. The feed roller 11 (Figs. 4 and 5) is journaled on a stud 28, suitably mounted in the frame of the machine, and a spur gear 29 is secured to this feed roller 11. The similar feed roller 12 is secured to a shaft 30 to which a spur gear 31 is also secured, said shaft 30 being suitably journaled in the frame of the machine. The spur gears 29 and 31 mesh with each other so that by rotating the shaft 30 both feed rollers 11 and 12 will be driven to propel the material. The shaft 30 has secured thereto a second spur gear 32 driven by a train of gears hereinafter described.

Calling attention to Figs. 4, 5, 7 and 17, it will be seen that the platen or main drum 14 is secured to a shaft 33 suitably journaled in the frame of the machine. A worm gear 34 also secured to the shaft 33 meshes with and is driven by a worm 35 on a worm shaft 36 which is coupled to the shaft of an electric or other motor 37 through a coupling device 38. The coupling device is shown to be of the pin and radial slot type and effects a readily detachable drive connection between the worm and motor and one which is operative although the worm and motor shafts may be more or less out of alignment. A spur gear 40, co-axially mounted with respect to the worm gear 34 and secured thereto so as to rotate therewith, meshes with a spur gear 41 (Figs. 5 and 7) secured to a shaft 42 suitably journaled in the frame of the machine. The shaft 42 has also secured thereto a spur gear 43 which meshes with the spur gear 32 above referred to as being secured to the shaft 30 of the feed roller 12.

The above described parts including the gearing interconnecting the platen or main drum 14 and the feed rollers 11 and 12 are preferably so designed that the linear or peripheral speeds of the rollers 11 and 12 will be equal to each other but slightly greater than that of the drum 14. By virtue of this design important functions and results are obtained as will hereinafter appear.

I prefer to provide means for removing the curvature or at least a part of the curvature of the material so that the discharged printed cards will be substantially flat or plane. It will be appreciated that the pre-set or curvature of the material will increase as the size of the roll 10 diminishes so that the curvature-removing means should be adjusted to meet this varying condition. I therefore automatically control the adjustment of the curvature-removing-means in accordance with the varying diameter of the roll 10. One form of structure for accomplishing these results is shown in Figs. 1, 2, 4, 16 and 18 and may be constructed substantially as follows:

A bar 45 is secured to a shaft 46, suitably journaled for oscillation in the frame of the machine. A second bar 47 is secured to the shaft 46 in such position that the material will pass between said bars 45 and 47 as clearly shown in Fig. 16. The bar 47 carries a bracket portion 48 to which a stub shaft or pivot pin 49 is secured. A third bar 50 is oscillatably mounted on the pivot 49 and is provided with a pin 51 which passes through the inclined or cam slot 52 (Fig. 4) provided in the frame of the machine. The shaft 46 has secured thereto an arm 53, shown in dotted lines in Fig. 2, to which a link 54 is pivotally connected. The latter is adjustably and pivotally connected at its other end to the short arm 55 of a bell crank lever pivoted at 56 on the frame of the machine. The long arm 57 of the bell crank lever carries a roller 58 which engages the periphery of the roll 10.

Directing specific attention to Figs. 1, 2, 4 and 16, it will be seen that as the roll 10 becomes smaller the shaft 46 and bars 45, 47 will move in a counter-clockwise direction about the axis of said shaft, and the cam slot 52 and pin 51 will cause the bar 50 to move in a clockwise direction about the pivot 49 and with respect to the bars 45, 47. The paper or material will therefore be bent at a sharper angle as it passes through the straightening device 46—47—50 and the curvature more effectively removed therefrom.

I prefer to employ the drum 14 as a measuring device for the length of cards as well as a platen and it is therefore important that there be no slip between the material and the drum. For this and other reasons I provide a plurality (three as illustrated) of presser rolls 60, 60, 60, each secured to a corresponding one of shafts 61, 61, 61 (Figs. 4 and 6) suitably journaled in the frame of the machine. Each of the shafts 61 has secured thereto a corresponding one of three spur gears 62 each of which meshes with and is driven by the gear 40. It will be noted that each of the rolls 60 rotates in a direction opposite to that of the drum 14 and the design of parts is such that peripheral speed of each roll 60 is equal to that of the drum 14. It is desirable that means be provided whereby the rolls 60 may each be adjusted toward and away from the drum or platen 14. This means may assume the form of eccentrically bored bushings, such as that shown at 65 in Fig. 13, provided, one for either or both ends of the shafts 61 of the rolls 60. Each of these journal bushings is shown provided with an integral plate 66 (Fig. 2) and a thumb or finger piece 67 whereby it may be oscillated. Set screws 68 extending through the slots 69 in the plates 66 permit adjustment and provide means for holding the parts in adjusted position. Obviously by moving the members 67 in the proper one of opposite directions the shafts 61 and rollers 60 may be caused to approach or recede from the drum 14. I shall now describe the type roll 15 and the means for actuating the same, attention being directed to Figs. 3, 4, 5, 6 and 20.

The type roll 15 is shown in the form of a sleeve provided with a tapered bore adapted to receive the frusto-conical portion 70 of the shaft 71. The latter is screw-threaded at 72 to receive a nut 73 which, together with the washer 74, provides a means for removably securing the type roll to the said shaft 71 and provides for register-adjustment of said type roll 15. One end of the latter is journaled at 75 in the frame of the machine and is threaded at its reduced outer end to receive a nut 76 whereby it may be held against endwise movement with respect to the frame and yet be removed therefrom when desired. The opposite end 77 of the shaft 71 is shown journaled in the cylindrical bore of an adjusting bushing 78. The exterior of the latter is cylindrical but its shaft-receiving bore is not co-axial but is eccentric with respect to the outer cylindrical periphery of the said bushing. The latter is rotatably mounted in the bracket 79 and is provided with an integral plate 80 having a slot 81 through which a set screw 82 extends. In view of the description set forth in connection with the generally similar parts associated with the presser rolls 60, it will be obvious that, by virtue of the elements 78 to 82, the type roll 15 may be adjusted toward or away from the drum 14 and held in adjusted position. The bracket 79 is preferably detachably connected to the frame of the machine as by means of one or more cap screws 85 and one or more dowel pins 86. By constructing the dowel pins and the corresponding holes which receive them of hard metal, and accurately machining them a means is provided whereby the bracket 79 and supported parts may not only be removed but readily restored to exactly the same position as was occupied before such removal. The shaft 71 has secured thereto a spur gear 90 which meshes with and is driven by the gear 40 so there will be no slip between the type, carried by the sleeve 15, and the periphery of the drum 14. The hub 91 of the gear 90 abuts against the frame portion 75 and also serves to limit the endwise movement of a sleeve 92 which surrounds the shaft 71 and abuts at its other end the type roll 15.

Before or at the time the material leaves the drum 14 it is cut or sheared to form cards of the desired dimension (length in this case). The shearing mechanism is automatic and accurate in its operation and is preferably constructed as follows. (See particularly Figs. 4, 5, 6, 8, 16, 17 and 19.)

The drum 14 is so designed that its circumferential or peripheral length is an exact multiple of the desired card length. In the present case the circumferential length of the drum 14 is three times the card length. The drum is provided with three equi-angularly spaced knives 100 whose outer leading edges are straight and parallel with respect to the axis of the drum 14 and form cutting edges. It will be understood that the drum 14 is suitably grooved to receive the knives 100 and the latter may be removably held in position by means of wedge blocks or plates 101. The movable knife 16 is adapted to coact with each of the knives 100 at the proper time in the cycle of operation to perform the card-shearing operation. Means are provided for automatically actuating the knife 16 to perform this function and may be constructed as follows:

The knife 16 is pivotally mounted at 105 on a lever 106 so as to be capable of a slight degree of pivotal movement with respect thereto. The knife or blade 16 is biased in a counter-clockwise direction about its pivot 105 by means of a compression spring 107 and the extent of such movement is limited by the engagement of the knife with the laterally projecting lug 108 provided on the lever 106. The latter is provided with a bearing portion 109 forming an eccentric strap surrounding and adapted to cooperate with an eccentric 110 mounted upon but rotatable with respect to the shaft 33 of the drum 14. The end 111 of the arm 106 is slotted as indicated at 112 to slide on a pin 113 secured to the frame of the machine. It will be seen that rotation of the eccentric 110 will so move the lever 106 as to cause the knife alternately to approach and recede from the drum 14, the path of movement of the knife 16 being substantially an ellipse. In order to aid in supporting and operating the arm 106 in its above described movement, a lateral extension 114 is provided on the lever 106 and this extension has detachably secured thereto (Fig. 17) a member 115 which forms an eccentric strap 116 for an eccentric 119 secured to the sleeve 122 in a manner similar to the securing of the member 110.

The means for driving the eccentric 110 may be constructed as follows.

The hollow hub 120 of the eccentric is operatively connected, by means such as set screw 121, to a sleeve 122 surrounding but rotatable with respect to the shaft 33. Endwise movement of the sleeve 122 is limited by abutment with the members 110 and 117 into which the sleeve extends. The sleeve 122 has also secured thereto, by suitable means such as a set screw 123, a gear 124. This gear 124 (Figs. 5 and 8) meshes with an idler gear 125 which in turn meshes with and is driven by the gear 43, hereinbefore described as being driven by the gears 40, 41. It will be noted that each of the knives or blades 100 is provided with a radially-outward-projecting lug 126 (Fig. 19) which is provided with a beveled surface adapted to be engaged by the knife 16. It will be noted further that the cutting edge of the knife 16 is in the same plane with but is not parallel to the axis of the drum 14 (Fig. 19) so that the shearing commences at one edge of the card material and proceeds across to the opposite edge.

Figure 4:
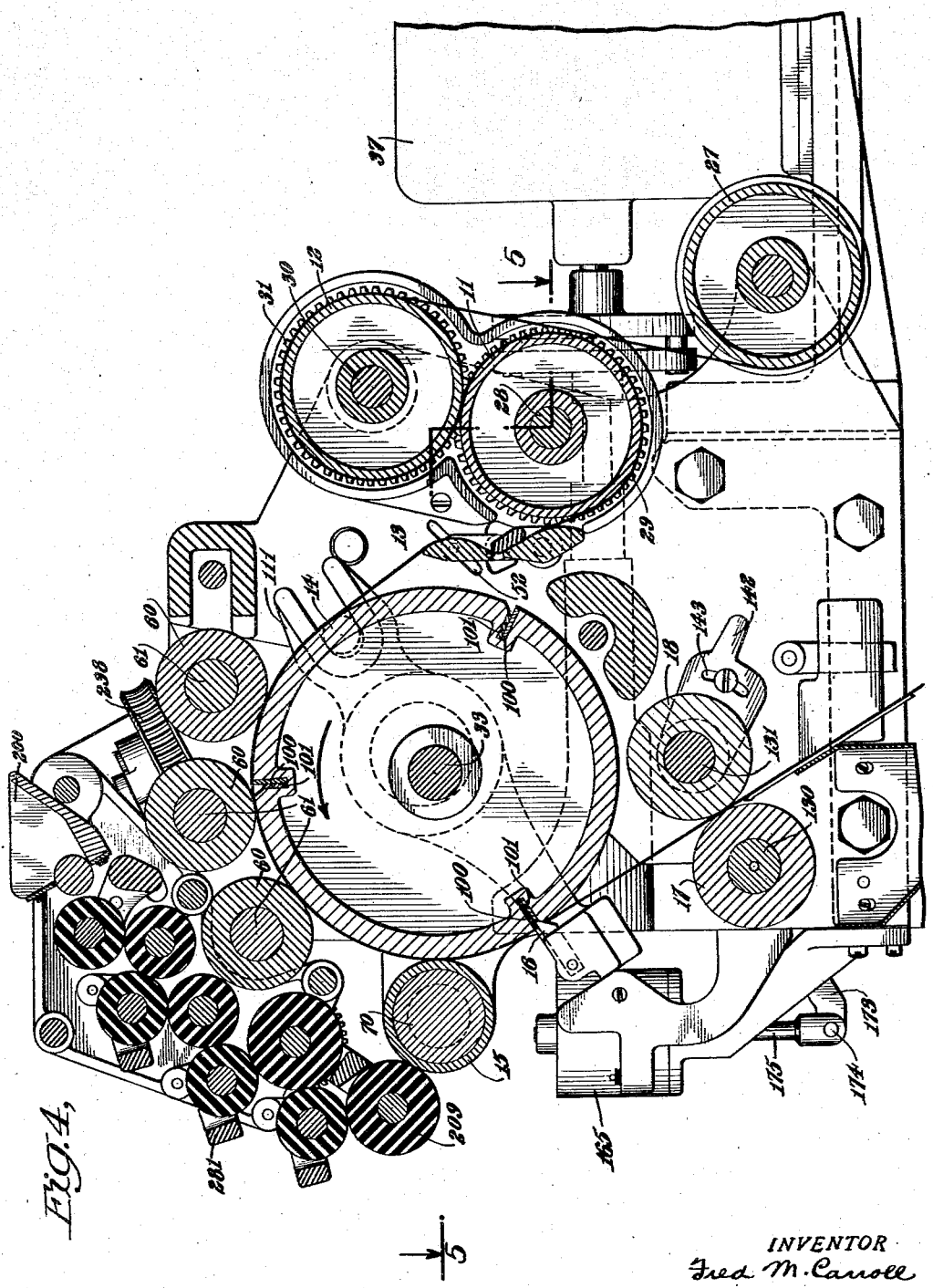
Fig. 4 is a sectional elevation taken substantially on the line 4—4 of Fig. 5.
Figure 5:
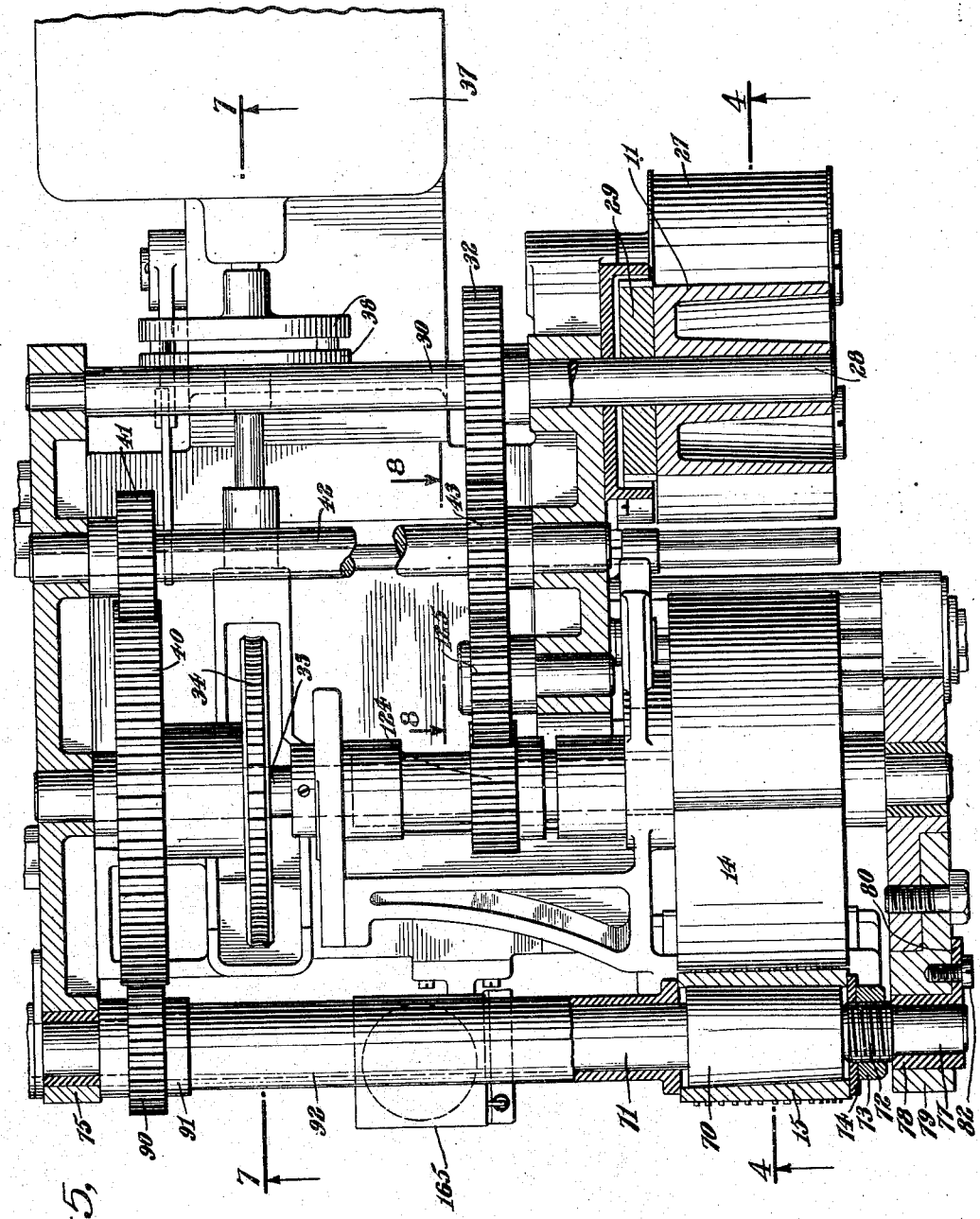
Fig. 5 is a plan view partly in section taken on the line 5—5 of Fig. 4.

The above described parts are so designed that before any knife 100 reaches the position occupied by the lower left hand knife 100 in Fig. 4 its lug 126 is engaged by the knife 16 and cams the latter into proper shearing alignment with respect to the adjacent knife 100. As the movement of parts proceeds the knife 16 moves substantially radially inward to shear the card material until the innermost position of the knife 16 is reached, at which time the material is cut across its entire width. As the movement of parts proceeds further the knife 16 is moved away from the drum and ultimately, and at the proper time, contacts with the lug 126 of the next knife 100, and so on.

Before any card has been severed from the remainder of the material its leading edge will have passed between the rollers 17, 18, and gripped thereby. For reasons hereinafter stated these rollers 17 and 18 are preferably so driven and so timed that they will present the same points on their peripheries to any card entering between them as they do to any other card so entering but their linear peripheral speeds are slightly in excess of that of the drum 14. It will be seen that these two requirements are not inconsistent and are readily obtainable, the first being a function of angular velocities and the second a function of angular velocities of rolls 17 and 18 and the radii of the latter. I shall now proceed to describe the driving means for the rollers 17 and 18, having specific recourse to Figs. 4 and 7 for this purpose.

The rollers 17 and 18 are each secured to a corresponding one of the shafts 130, 131 suitably journaled in the frame of the machine. Each of the shafts 130, 131 has secured thereto a corresponding one of identical gears 132 and 133 which mesh with each other. The gear 133 meshes also with a suitably journaled idler gear 134 which in turn meshes with and is driven by the gear 40. The rollers 17 and 18 are preferably provided with card-corner-clipping devices. Before proceeding to describe these devices, I shall describe the means for conveying the cards to the receptacle or tray 19.

Figure 2:
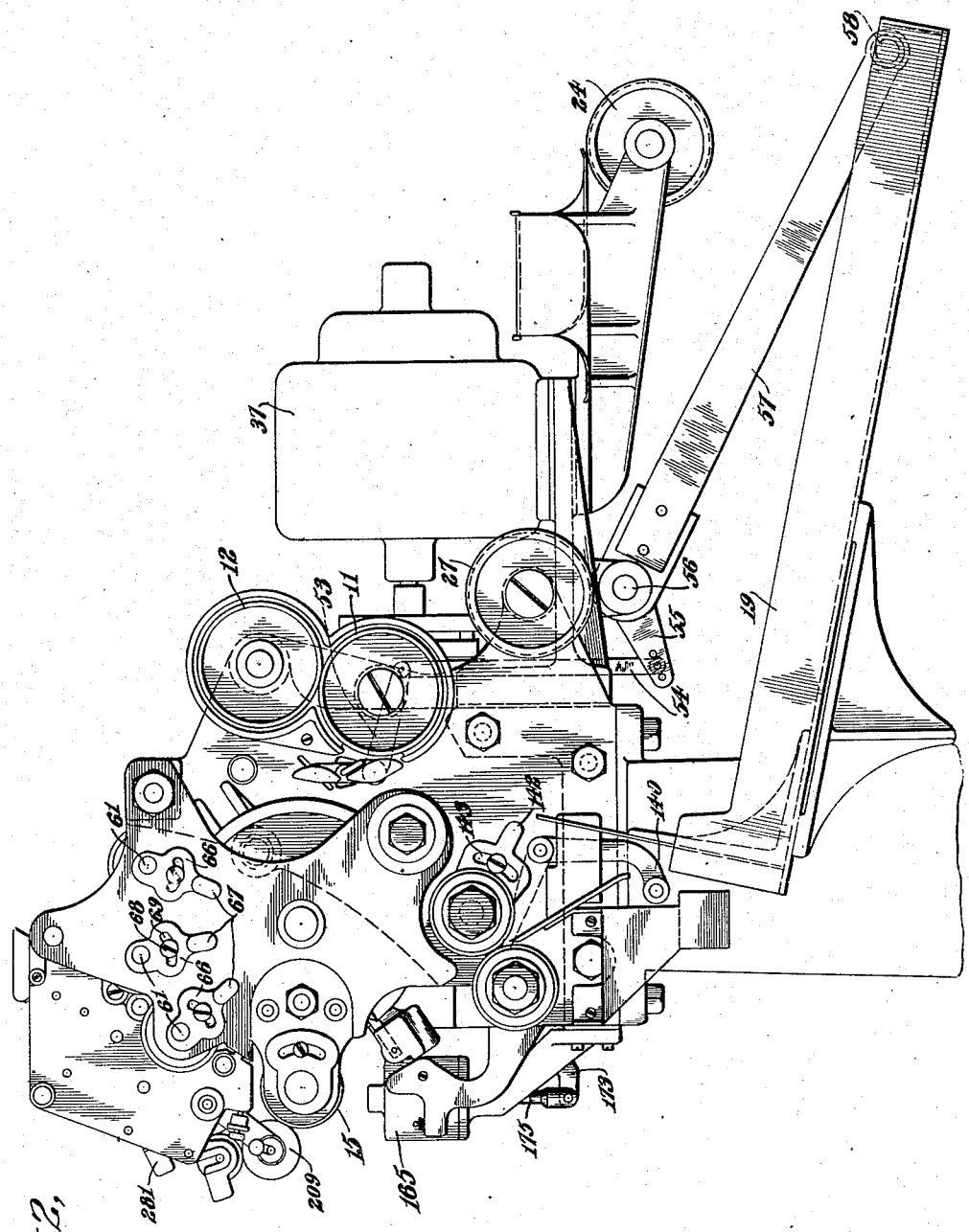
Fig. 2 is an enlarged elevation of the upper part of the machine shown in Fig. 1.

By inspecting Figs. 1, 2 and 9 it will be seen that the cards pass from the rollers 17, 18 over a plate 135, suitably secured to the frame of the machine, and thence into the box or tray 19, secured to and carried by the pedestal 21. The tray 19 is shown provided with a slidable member 136 which is substantially the same in construction and operation as a book rack. As cards accumulate in the tray the member 136 is automatically slid to the right (Figs. 1, 2, 9, 10 and 12) by means now to be described.

The gear 132 of the roller 17 has secured thereto a roller 137 adapted to engage and operate the arm 138 of a bell-crank lever pivotally mounted at 139 upon the frame of the machine. The arm 140 of the bell-crank is provided with a roller 141 adapted to engage the member 136 or the extreme left-hand one of the cards in the tray to propel the same to the right. Those parts are preferably so designed that, in the interval of time between the entry of each card and a succeeding card into the tray, the roller 141 is operated to move the member 136, and any cards in the tray, to the right a sufficient distance to make room for the next card. The arm 140 is biased away from the cards by means of a coiled spring 139ª (Fig. 10).

Attention is called to the fact that the shaft 131 of the roller 18 is journaled in an eccentrically bored member 65 (Fig. 13)

which is provided with a manually operable member 142, set screw 143, etc., whereby the roller 18 may be adjusted toward or away from the roller 17 and held in adjusted position. In view of the foregoing description of the similar parts 66, 67, 68, 69, etc., no further description is necessary. It will be noted further (Fig. 13) that the card-engaging peripheries of the rollers 17, 18 are provided with annular ribs 145 which are so spaced as to engage the printed card material between the printed columns. In this way smudging or blurring of the printed matter is avoided.

As mentioned above the rollers 17, 18 are preferably provided with devices for clipping the corners of the cards or card material. One form of such device is illustrated in Figs. 13, 14 and 15 in detail. The roller 18 is there shown provided with an insert 146 of steel or other suitable material and having a raised portion 147 providing a diagonal cutting edge 148. The roller 17 is provided with an insert 149 having a raised portion 150 and diagonal cutting edge 151 which are complementary to the elements 147, 148. The design is such that one of the two trailing corners of each card, entering between the rollers 17, 18, is clipped or sheared off by the cooperating cutting edges 148—151. In order to insure that these clippings will not be thrown to such position as to injure the machine or the cards, I preferably provide means for holding each such clipping to one of the rollers 17, 18 until it is in proper position to be discharged therefrom. While the clippings when released from the said roller may be allowed to drop by gravity in certain cases gravity alone may not prove effective. For example, static or frictional electricity may at times cause the clippings to adhere to the rolls. I therefore propose not only to provide means for holding each clipping to the roller until the discharge position is reached but also means for positively forcing each clipping away from the roller when the discharge position is reached. A now preferred form of such means is illustrated in Figs. 9, 10, 11, 13, 14 and 15 and may be constructed substantially as follows.

The shaft of one of the rollers 17, 18, in the present case the shaft 130 of the roller 17, is provided with a duct 155 which communicates at one end with a port 157, in the insert 149, through the port 156 provided in the roller 17. The other end of the duct or passage 155 terminates in a radial branch 159. The latter is adapted to cooperate with the ports 160, 161, provided in a member 162 partially surrounding the shaft 130 and forming therewith a valve as clearly indicated in Fig. 11. The member 162 is provided with ducts or passages 163, 164 leading from the ports 160, 161 to upper and lower ends respectively of a cylinder 165 of a pump which is suitably secured to the frame of the machine. It will be seen that when the parts are in the position shown in Fig. 9 and indeed as long as the port 159 registers with the port 161 communication is established between the port 157 and the lower part of the cylinder 165. At this time the insert 149 moves from the position shown in Fig. 9 to a position below the axis of the roller 17. When the insert 149 and its port 157 are substantially directly below the axis of the roller 17, communication between the lower part of the cylinder 165 and the said port 157 is cut off, and communication between the upper end of the cylinder and the port 157 is established through the following passages: 163—160—159—155—156—157. Mechanism is provided for automatically causing the pump to create a suction or negative pressure at the port 157 when the ports 159—161 are in communication and for providing a positive pressure at the port 157 when the passages 159—160 communicate. I shall now proceed to describe the particular form of such mechanism illustrated in the drawings.

The shaft 131 has secured thereto a cam 170 adapted to engage and operate the arm 171 of a bell-crank lever pivoted at 172 on the frame of the machine. The other arm 173 of the bell crank is connected at 174, by a suitable pivotal connection with the piston rod 175 of the pump. The rod 175 is provided with a shoulder portion (Fig. 10) adapted to engage the lower side of and move the piston 176 upwardly in the cylinder 165. A compression spring 177 biases the piston and connected parts toward the opposite position. The parts are preferably so timed that when the ports 159—161 are in communication the piston 176 is moving upwardly and creating a suction or negative pressure in the lower part of the cylinder and consequently at the port 157. This suction holds the clipping to the roller 17. Communication is established between the ports 159—160 before the piston is permitted to move downwardly. Bearing in mind that upward movement of the piston 176 compresses air in the upper part of the pump cylinder it will be appreciated that when the ports 159—160 communicate a blast of compressed air is discharged through the port 157, thus positively impelling the clipping downwardly away from the roller 17 and into a suitable chute or receptacle 180. The above described cycle is repeated as each clipping of the corner of a card is effected.

Various forms of mechanism may be provided for supplying ink to the type roll 15. I prefer, however, to employ the form of means illustrated generally in Fig. 22 and more in detail in other views hereinafter referred to. I shall first describe the ink-supply means generally (see Fig. 22). A hopper 200 is supplied with ink. A rotating roller 201 is mounted so as to extend into the hopper and to receive a coating or layer of ink. A rotating roller 202 is oscillated alternately to contact with the roller 201 to receive ink therefrom and with a rotating roller 203 to supply ink thereto. The ink is then transferred, by means of the train of rotating rollers 204 to 209 inclusive, from the roller 203 to the type roll 15. The rollers 202, 204, 206, 208 and 209 are preferably of composition such as that commonly employed for similar rollers in the printing art, while the rollers 201, 203, 205 and 207 are preferably metal. Besides providing means for automatically oscillating the roller 202, as above described, and for rotating the various rollers, I preferably provide means for automatically reciprocating certain of the rollers in axial directions. One form of mechanism whereby these various functions may be accomplished is illustrated in detail in Figs. 4, and 20 to 26, inclusive, and may be constructed substantially as follows.

Figure 3:
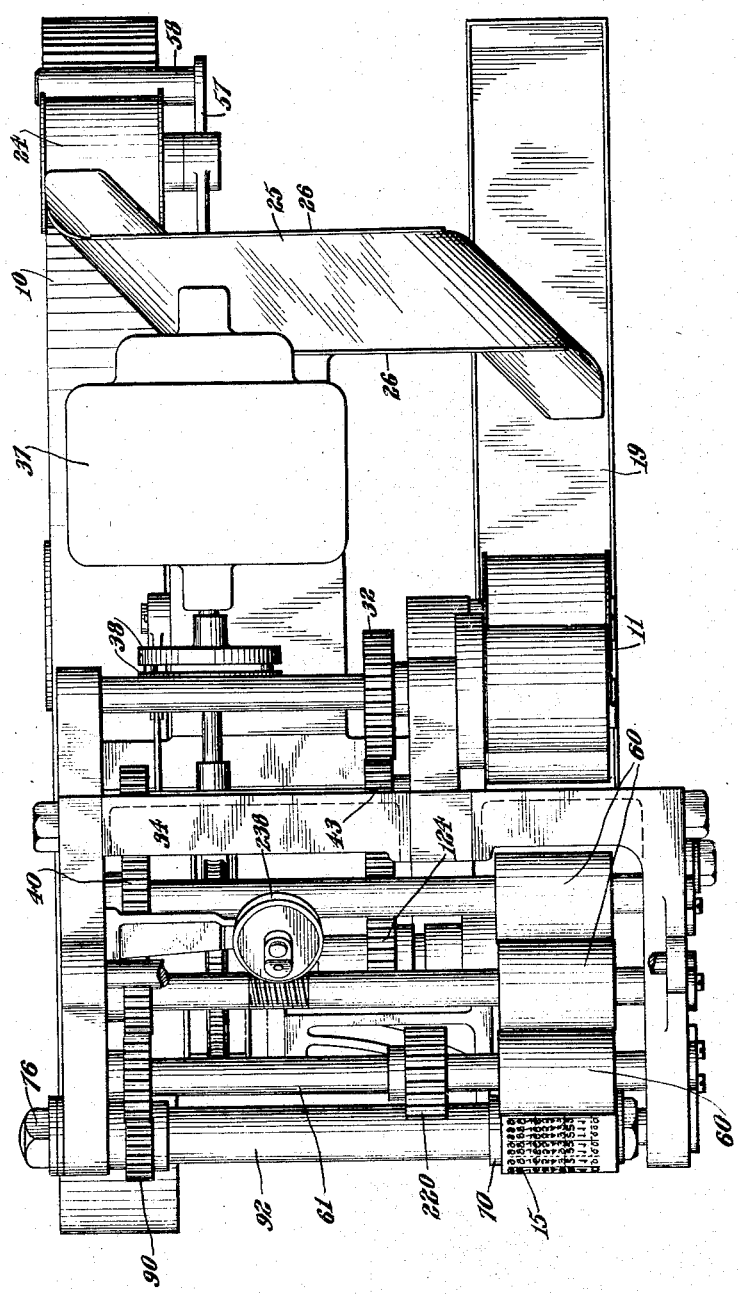
Fig. 3 is a plan view of the machine shown in Figs. 1 and 2.
Figure 6:
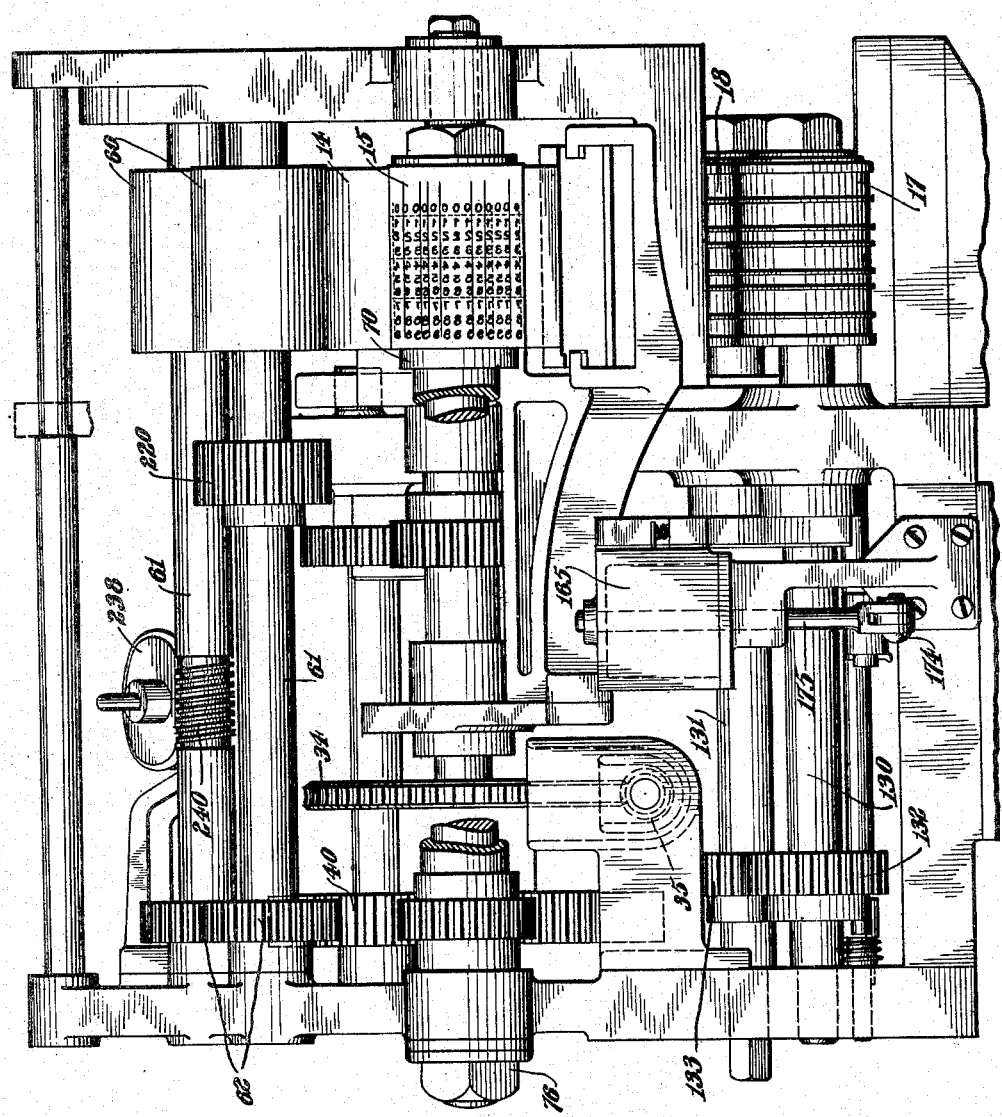
Fig. 6 is a detail end elevation of the machine.

The shaft nearest the type roll 15 has secured thereto a gear 220 (see also Figs. 3 and 6). This gear 220 meshes with and drives gears 221, 222 and 223 which are each secured to the shafts 224, 225 and 226, respectively, to which the rollers 203, 205 and 207 are respectively secured. The latter are thus rotated when the machine is in operation. The shafts 224 and 226 are not only suitably journaled for rotation in the frame of the machine but are mounted so as to be moved in opposite endwise or axial directions. Spaced collars 227 are secured at one end of the shaft 224 and similar spaced collars 228 are secured at one end of the shaft 226. A T-shaped lever having four arms 229, 230, 231, is pivotally mounted at 232 on a bracket 233 secured to the frame of the machine. The arm 229 is pivotally connected at 234 to a link 235 in turn pivotally connected at 236 to a crank arm 237 connected to and driven by a worm gear 238. The latter is mounted for rotation in a bucket 239, carried by the frame of the machine, and meshes with a worm 240 provided on the middle one of the shafts 61. Obviously when the last mentioned shaft 61 is rotated, the T-shaped lever will be oscillated about its pivot 232. The arm 230 carries a roller 241 which engages both inner faces of the collars 227, 227 and the arm 231 carries a roller 242 which engages both inner faces of the collars 228, 228. Upon oscillation of the T-shaped lever, as above described, the shafts 224, 226 and the inking rollers 203, 207 secured thereto will be reciprocated in axial directions. I shall now proceed to describe the mechanism for rotating the roller 201.

The shaft 245, to which the roller 201 is secured and which is suitably journaled in the frame of the machine, has secured thereto a ratchet wheel 246. An arm 247 is mounted upon the shaft 245 for oscillation with respect thereto and has pivotally connected thereto, at 249, a pawl or dog 248 adapted to engage and operate the ratchet wheel. The pawl 248 is biased toward ratchet-engaging position by a spring 250. A cam plate 251 mounted upon and adjustable about the shaft 245 is adapted to engage the pawl 248 and to govern the length of operative stroke thereof in operating the ratchet. A slot 252, provided in the cam plate, and a cooperating set screw 253 provide means for holding the cam plate in any desired position of adjustment. For oscillating the pawl arm 247, one end of a reciprocatory link 254 is connected to the pivot 249, suitable clearance being provided. The other end of the link 254 is pivotally connected at 255 to an arm 256 secured to the T-shaped lever 229—230—231 (Figs. 23 and 24). Upon oscillation of the T-shaped lever, the arm 256 is oscillated and the link 254 reciprocated to oscillate the pawl arm 247 and thereby rotate the ratchet wheel 246 and inking roller 201 intermittently or step-by-step.

As set forth above, devices are provided for causing the roller 202 alternately to contact with the rollers 201 and 203. The devices illustrated are constructed substantially as follows. The shaft 260, to which the roller 202 is secured is rotatably mounted in a pair of arms 261 each pivotally mounted at 262 on the frame of the machine. The arms 261 are joined by a cross bar or member 263 thereby forming a frame 262—263 in which the roller is rotatably mounted and which frame is oscillatable about the pivots 262. A rod 265 is secured to this frame and extends through a suitable clearance opening 226 in one of the side frames of the machine, and thence through an opening 267 in the link 254. Bearing in mind that the link 254 reciprocates when the machine is operating, it will be appreciated that the rod 265 will be reciprocated (through the lost motion connection illustrated) and the frame 262—263 oscillated. The roller 202 is thus automatically oscillated between and alternately into contact with the rollers 201 and 203.

I prefer to provide mechanism for snapping the roller 202 into contact with the rollers 201 and 203 in a manner generally similar to the action of an electric snap switch. For this purpose, I provide the rod 265 with a knife edge 270 (Fig. 26) adapted to cooperate with the vertex or apex portion 271 of an arm 272, pivoted at 273 on the frame of the machine and strongly biased toward the rod 265 by means of a spring 274. By virtue of the connections above described, when the roller 202 is being moved by the link 254 from either of rollers 201, 203 toward the other of the said rollers, as soon as the knife edge 270 passes the apex 271 the spring 274 causes the roller 202 to snap into engagement with the roller 201 or 203 toward which it is moving at that particular time.

The rollers 202, 204, 206, 208 and 209 are simply idler rollers in a sense. While they serve as ink conveyers they are not rotated about their axes except by contact with the other inking rollers which they engage. The rollers 204, 206 and 208 are each secured to a corresponding one of shafts 280, 280, 280 which are each rotatably and removably mounted in a corresponding one of frames or yokes 281, 281, 281. Each of the two side members of each of the frames 281 is pivotally connected at 282 to the frame of the machine so that the said rollers 204, 206 and 208 are each biased by gravity into contact with the rollers which they engage. The roller 209 is secured to a shaft 285 rotatably mounted in journals 286 detachably mounted in a frame 287 pivoted on the shaft 226 of the roller 207. The journals 286 are each detachably connected to the frame 287 by means of pin and slot connections of which the pins are in the form of conically-headed set screws 288 each adapted to cooperate with a corresponding one of slots 289. In order to adjust the contact pressure of the roller 209 on the type roll 15, the frame 287 is provided with a lug 291 which is tapped to receive a set screw 290 adapted to engage the frame of the machine.

The operation of the machine may now be summarized as follows, assuming that a roll of blank material has been mounted in the position shown in Fig. 1, the strip threaded through the machine as indicated in Fig. 4, the hopper 200 supplied with ink, and the motor 37 set in operation. The strip of blank material passes from the roll 10, around the roller 24, over the track-way or guide 25, around the roller 27, around the feed roller 12, then around the feed roller 11, then through the straightening or curvature removing means 13, then around the drum or platen 14, between the latter and the type roll 15. The material then passes between the rollers 17, 18 and thence to the tray 19. The presser rollers 60 maintain the material in contact with the drum 14 and prevent any slipping between the material and the last named drum or platen. The peripheral speed of the feed rollers 11, 12 is slightly greater than that of the drum 14 so that there is a certain amount of slip between the material and said rollers 11, 12. These feed rollers 11 and 12, by virtue of their greater linear speed, with respect to that of the drum 14, tend to produce a loop of the material between the lower side of the roller 11 and the straightening device 13 (Fig. 4). This loop is prevented from cumulatively increasing in size because, as stated above, there is slip between the material and the feed rollers 11, 12, when the tension of the material at the exit side of the roller 11 is sufficiently reduced, which takes place upon formation of the loop. Before this loop disappears entirely due to the drawing off by the roll 14, the frictional contact between the material and the feed rollers 11, 12, again becomes effective to cause replenishing of the slack between the roller 11 and the straightening device 13. By virtue of this design the work in moving the material from the drum 10 to the rollers 11, 12 is performed solely by the latter and forms no part of the load upon the drum 14. As the material passes through straightening devices 13 (45—47—50) it is bent to remove wholly, or in part, the curvature or set which it received by being rolled to form the roll 10. The amount or degree of curvature-removing bend so imparted to the material is automatically governed by the elements 53 to 58 to increase the bend as the size of the roll 10 diminishes. When the material passes between the type roll 15 and the drum 14 each card length is printed in accordance with the set-up on the type roll. Ink is automatically supplied from the hopper 200 to the type roll 15 through the train of rollers 201 to 209, all of which rotate and some of which oscillate, as previously described, effectively to feed the ink to said type roll. After each card is printed it is automatically severed from the remainder of the material by the coacting knives 16—100. While each card is being severed it is held taut by the drum 14 and the rollers 17, 18, to which the material passes from the drum 14. As the leading end of each card enters between the rollers 17, 18 one of the corners thereof is clipped or sheared off by the co-operating cutting edges 148, 151. The corner so clipped off is held by suction, created by the automatically operating instrumentalities above described, to the roller 17 until the said clipping reaches substantially the lowermost position on the roller 17 when it is positively driven from the said roller, as previously described, and passes into the receiving chute 180. While the equal angular velocities of the rollers 17, 18 are such as to bring the cutting devices 148, 151 into proper position as each card leaves the said rollers, the peripheral velocities of the said rollers 17, 18 slightly exceeds that of the drum 14. The material between the drum 14 and rollers 17, 18 is thereby kept taut while the knife 16 is performing its severing operation. Furthermore, each card will have been ejected from the rollers 17, 18 before the following card enters said rollers. Passing from the rollers 17, 18, each card enters the tray 19 as shown in Fig. 9 and in the manner previously described. The group of cards in the tray 19 is periodically and automatically moved toward the right to make room for succeeding cards. A plurality of completed cards are shown in Fig. 27. By clipping the corners from the cards, the proper filing and handling of the same is greatly facilitated.

The operation of the machine will now be apparent to those skilled in the art in view of the foregoing disclosure. It is entirely automatic in its operation and possesses many advantages over the tabulating-card-printing machines now in use. It is not only reliable in operation but enables cards to be printed at a much higher rate than is possible with prior machines. I prefer to provide the type on the type roll by a photo chemical engraving process, thereby greatly cheapening the cost of operating the machine. Advantages other than those mentioned above will be apparent in view of the disclosure of the construction and operation of a now preferred form of the machine.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also while it is designed to use the various features and elements in the combinations and relations described, some of these may be altered and others omitted without interfering with the more general results outlined, and the invention, within the scope of the appended claims, extends to such use.

It will be noted that each of the bearings 286 (Figs. 20 and 23) is provided with a slot 501 adapted to register with a corresponding one of two slots 502, provided in the frame 287, when said bearings are rotated through 180° from the position shown in Fig. 23. When the slots 289—502 are brought into registry, as above described, the roll 209 will drop out of the frame without necessitating removal of the screws 288 or the journals 286.

What I claim is:—

1. A printing machine comprising in combination, a rotatable platen, power means for rotating said platen, feeding mechanism for supplying material to said platen and over which said material slips when its tension is relieved, and means for operating said feeding mechanism at a linear speed in excess of the peripheral speed of said platen.

2. A printing machine comprising in combination, a rotatable platen and means for rotating the same, means for severing material on said platen, means for withdrawing printed material from said platen, and means for operating said material-withdrawing means at a linear speed in excess of the peripheral speed of said platen.

3. A printing machine comprising in combination, a rotatable platen and means for rotating the same, feeding mechanism for supplying material to said platen, means for preventing slip of the material with respect to said platen, means for withdrawing printed material from said platen, and means for operating said feeding mechanism and material-withdrawing means at a linear speed in excess of the peripheral speed of said platen.

4. A printing machine comprising in combination, a printing couple, means adapted rotatably to support a roll of material, means for supplying material from said roll to said printing couple, devices interposed between said couple and roll for reducing the curvature of the material, and means automatically responsive to reduction in size of the roll for adjusting the said devices.

5. A printing machine comprising in combination, a printing couple of which the platen is rotatable, means for causing material to travel around and in contact with said platen, means for preventing slip of the material with respect to said platen prior to shearing, and means cooperating with said platen for cutting said material into card-lengths measured by said platen.

6. A printing machine comprising in combination, a printing couple including a platen, means for passing a continuous sheet of material through said couple at a continuous and substantially uniform speed, means for cutting said material into card-lengths upon said platen after it leaves the printing couple, devices for thereafter receiving and removing the material, and means for operating said devices whereby each card is discharged therefrom before the following leading edge of the material is received by said devices.

7. A printing machine comprising in combination, a printing couple including a platen, means for feeding a continuous sheet of material through said couple, means for cutting said material into card-length upon said platen after it leaves said couple, and means for thereafter removing a portion of each card from the remainder of the card.

8. A tabulating-card-printing machine comprising in combination, means adapted rotatably to support a roll of material, a plurality of feed rollers, means for guiding the material to said feed rollers, a rotatable platen around which the material passes, devices interposed between said platen and roll for reducing the curvature of the material, means automatically responsive to reduction in size of the roll for adjusting said devices, means for rotating said platen and said feed rollers whereby the peripheral speed of the latter exceeds that of said platen, a plurality of pressure rolls for engaging the material passing around said platen, a type roll cooperating with said platen, shearing devices and means for automatically operating the same to cut the material into card-lengths before it leaves said platen, a pair of rollers to which the material passes from said drum, cooperating corner-clipping devices carried by said last-mentioned rollers, means for rotating said last mentioned rollers at a predetermined angular velocity with respect to said drum but at a higher peripheral speed whereby said corner-clipping devices are presented to the trailing end of each card and each card leaves the last named rollers before the following card enters the same, means for automatically holding each corner-clipping to one of said last named rollers until it is clear of the remaining card material, means for thereafter automatically ejecting the clipping from said last named roller, a receptacle into which the cards pass from said two last named rollers, and periodically operated means for displacing the cards in said receptacle to make room for other cards.

9. A printing machine comprising in combination, a printing couple of which the platen is rotatable, means for supplying material to said platen, means for continuously rotating said platen, and means for cutting said material into card-lengths before it leaves said platen, said last named means comprising a knife and means for reciprocating said knife toward and away from said platen and for moving said knife in opposite direction transversely of the line connecting its extremes of reciprocatory movement toward and away from the platen.

10. A printing machine comprising in combination, a printing couple of which the platen is rotatable, means for supplying material to said platen, and means for cutting said material into card-lengths, said last mentioned means comprising a shearing couple of which one element is carried by said platen and the other element of which is movable toward and away from first named element, and means comprising a cam lug carried by said platen for engagement with said second named element to guide the same into shearing position with respect to said first named element.

11. A printing machine comprising in combination, a rotary platen and a rotary impression roll, means for feeding material to said platen, means timed with respect to said platen for accurately cutting the material into card-lengths before it leaves said platen, and means whereby said platen and impression roll may be relatively angularly adjusted to cause the printing to bear a predetermined relationship with respect to the card-length.

12. A tabulator card printer comprising in combination, a printing couple comprising a rotary platen roll and a rotary printing roll, means for feeding a web of material from a supply roll to the rotary platen roll, means for straightening said material before the same is applied to said roll, means for cutting the material into card-lengths after the same has passed the printing roll and while the continuous web is advancing upon the platen roll, and means for withdrawing and delivering the completed cards, said straightening means being adapted to modify the normal curvature of the material sufficiently to permit the delivery of the completed cards in substantially flat condition.

13. A tabulator card printer comprising a printing couple including a rotary platen, means for supplying a web of material to said rotary platen, means for effecting printing thereon while the latter is in continuous motion and means for cutting said web into cards of uniform length, said means comprising a plurality of fixed knives carried by the platen and a movable knife which progressively cooperates with successive of said fixed knives to sever the intervening web of material into cards.

14. A card printing machine adapted to receive a web of material to print thereon and to subsequently sever the web into cards, said machine including a rotary printing couple including a rotary platen, means for applying the web of material to said platen, and for guiding the web partially around the same, and severing means adapted to oscillate around the periphery of said platen and to reciprocate in a direction normal to said periphery, for severing the web into cards while the said web is in contact with said platen.

15. A card printing machine adapted to receive a web of material to print thereon and to sever the web into cards of uniform length, said machine including in combination, a printing couple of which the platen is rotatable, means for supplying a web of material to said platen, a plurality of knife elements carried by said platen, and movable knife means adapted for cooperation with the aforesaid knife elements on said platen and means for imparting a movement of translation to the movable knife means to substantially correspond with the movement of the platen whereby cutting may be effected of the material intervening between the platen-carried knife elements and movable knife devices while the latter are both moving at substantially the same velocity.

16. A card printing machine adapted to receive a web of material, to print thereon and to sever the same into cards, said machine including in combination, a printing couple including a cylindrical impression roll and a rotatable platen roll, means for driving the same in synchronism, fixed knife means carried by the platen and spaced thereon in accordance with the lengths of cards to be cut, means cooperating with said fixed knife means to sever the web into cards, and means whereby the impression roll may be adjusted with respect to its driving means in order to effect proper registration of the printed impressions upon the cards.

In testimony whereof I hereto affix my signature.

FRED M. CARROLL.